US012290961B2

(12) United States Patent
Rose et al.

(10) Patent No.: US 12,290,961 B2
(45) Date of Patent: May 6, 2025

(54) PLASTIC RECYCLING PROCESS

(71) Applicant: Impact Laboratories Limited, Grangemouth (GB)

(72) Inventors: Thomas Rose, Grangemouth (GB); Steven Burns, Grangemouth (GB); Emmeline Aves, Grangemouth (GB); Andrew West, Leicester (GB)

(73) Assignee: IMPACT LABORATORIES LIMITED, Grangemouth (GB)

( * ) Notice: Subject to any disclaimer, the term of this patent is extended or adjusted under 35 U.S.C. 154(b) by 762 days.

(21) Appl. No.: 17/275,243

(22) PCT Filed: Sep. 16, 2019

(86) PCT No.: PCT/GB2019/052589
§ 371 (c)(1),
(2) Date: Mar. 11, 2021

(87) PCT Pub. No.: WO2020/058679
PCT Pub. Date: Mar. 26, 2020

(65) Prior Publication Data
US 2022/0040889 A1    Feb. 10, 2022

(30) Foreign Application Priority Data
Sep. 17, 2018    (GB) ...................... 1815116

(51) Int. Cl.
*B29B 17/02*    (2006.01)
*B29B 17/00*    (2006.01)
(Continued)

(52) U.S. Cl.
CPC .......... *B29B 17/02* (2013.01); *B29B 17/0404* (2013.01); *C08J 11/08* (2013.01);
(Continued)

(58) Field of Classification Search
CPC ................ B29B 17/02; B29B 17/0404; B29B 2017/001; B29B 2017/0089;
(Continued)

(56) References Cited

U.S. PATENT DOCUMENTS 6,214,892 B1    4/2001    He et al.
6,223,904 B1    5/2001    Stephan et al.
(Continued)

FOREIGN PATENT DOCUMENTS

GB    1065105 A    4/1967
JP    52124078 A    10/1977
(Continued)

OTHER PUBLICATIONS

Gupta et al., "Decolorization of Colored Poly(ethylene terephthalate) Bottle Flakes Using Hydrogen Peroxide", Journal of Applied Polymer Science, vol. 107, pp. 3212-3220 (2008) (Year: 2008).*

(Continued)

*Primary Examiner* — Frances Tischler
(74) *Attorney, Agent, or Firm* — LAW OFFICE OF JESSE D. LAMBERT, LLC

(57) ABSTRACT

A process for the extraction of one or more colour pigments from waste plastic in which a waste plastic feedstock is mixed with a solvent in a reactor having a shearing mechanism and the solvent is separated out and recycled in the process. The shearing mechanism provides high shear, high contact mixing so as to move the pigment to the surface of the plastic for contact with the solvent to give efficient colour pigment removal. Embodiments of reactors with shearing mechanisms are described. Environmentally friendly solvents are also described. The process gives highly sought after natural recyclate at a commercial scale.

12 Claims, 3 Drawing Sheets

(51) Int. Cl.
*B29B 17/04* (2006.01)
*C08J 11/08* (2006.01)
*C08K 3/04* (2006.01)

(52) U.S. Cl.
CPC .......... *C08K 3/04* (2013.01); *B29B 2017/001* (2013.01); *B29B 2017/0089* (2013.01); *B29B 2017/0217* (2013.01); *B29B 2017/0464* (2013.01); *C08J 2367/02* (2013.01)

(58) Field of Classification Search
CPC .... B29B 2017/0217; B29B 2017/0293; B29B 2017/0464; B29B 2017/0484; B29B 7/489; B29B 7/66; B29B 7/826; B29B 7/94; B29K 2105/0032; C08J 11/02; C08J 11/06; C08J 11/08; C08J 2367/02; C08K 3/04; Y02W 30/62
See application file for complete search history.

(56) References Cited

U.S. PATENT DOCUMENTS

| | | | |
|---|---|---|---|
| 7,947,750 | B2 | 5/2011 | Ozer et al. |
| 2004/0196462 | A1 | 10/2004 | Schultheiss et al. |
| 2008/0255259 | A1 | 10/2008 | Ozer et al. |
| 2014/0008821 | A1 | 1/2014 | Toyoda et al. |
| 2015/0298360 | A1 | 10/2015 | Fullana Font et al. |
| 2016/0107981 | A1 | 4/2016 | Artigas et al. |
| 2017/0369670 | A1 | 12/2017 | Van Berkum et al. |
| 2018/0216283 | A1* | 8/2018 | Bokka .................. D06P 5/132 |

FOREIGN PATENT DOCUMENTS

| | | |
|---|---|---|
| JP | H06234862 A | 8/1994 |
| JP | H10249315 A | 9/1998 |
| WO | WO 2014/209117 A1 | 12/2014 |
| WO | WO 2016/016623 A1 | 2/2016 |
| WO | WO 2016/105198 A1 | 6/2016 |
| WO | WO 2016/105200 A1 | 6/2016 |
| WO | WO 2016159800 A1 | 10/2016 |

OTHER PUBLICATIONS

European Patent Office as International Search Authority; International Search Report and Written Opinion for PCT/GB2019/052589; Dec. 18, 2019; all pages; European Patent Office, Rijswijk, The Netherlands.

Intellectual Property Office of the UK Patent Office; Combined Search and Examination Report for GB1815116.7; Dec. 11, 2018; all pages; Intellectual Property Office of the UK Patent Office, Newport, United Kingdom.

Van Velzen, E.U. Thoden et al; Solvent extraction as additional purification method for postconsumer plastic packaging waste; Jun. 28, 2011; all pages; Wagenigen Food & Biobased Research, The Netherlands.

Per Haagensen As; Clearplast Report Summary; Aug. 15, 2018; all pages; Per Haagensen, Norway.

Carey, John; On The Brink of a Recycling Revolution?; Proceedings of the National Academy of Sciences; Jan. 24, 2017; all pages; United States National Academy of Sciences; United States of America.

* cited by examiner

PLASTIC RECYCLING PROCESS

The present invention relates to a plastic recycling and more particularly, though not exclusively, to a process for pigment extraction in plastics to increase their use in secondary applications.

Recycling of waste materials has now become a major environmental driver. In this regard the recycling of plastics is placed high on the agenda as these are non-biodegradable. Unfortunately, a key stumbling block to the ideal of a closed loop circular economy is recycler's ability to extract value from mixed plastic waste for resale and reuse. Currently recyclers extract value by simply separating the plastics into groups for resale with the vast majority of it being a mixed colour granulate. This colour limits the secondary application for recycled plastics as molders and manufacturers have no choice in colour selection so any products are black, low value and out of sight. As a result, the resale value of recyclate remains low and recyclers can only extract value from a small percentage of material economically.

Processes currently exist to clean the surface of the plastic by using solvents to remove dirt, soil, prints, lacquer, paper fibres, glue, etc. while also removing the smell. The University of Alicante has developed a process to remove ink on plastic film. The process has been tested successfully in a pilot plant on several plastic films (Polythene, Polypropylene, Polyester, and Polyamide). It has also been tested on both water and solvent based inks. However, these do not remove the colour from the plastic film itself merely the ink on the surface.

A number of techniques have been tested at the laboratory level for removing the colour pigment including: polymer additive extraction (not specifically for colour pigments) via soxhlet extraction using refluxing chloroform; CdS pigment removal from waste PE using hydrochloric acid and 1,4-butanediol; and pigment extraction using supercritical $CO_2$. These techniques have disadvantages in: requiring very long extraction times (days), high energy requirements and the suspected carcogenicity of chloroform in use; limited to a single pigment and long extraction time (hours); and poor levels of extraction, which make them unsuitable for scaling to commercial plant level and using in a continuous or near continuous process.

WO2014209117, WO2016105198 and WO2016105200 to IONIQA TECHNOLOGIES B.V. describe a method of degrading a polymer into oligomers and/or monomers in a solvent, using a catalyst, and a functionalized magnetic particle comprising a catalyst being capable of degrading the polymer into oligomers and/or monomers. The method and particle provide a high selectivity and a high conversion ratio. By equipping nanoparticles with catalysts that depolymerize PET (polyethylene terephthalate) into its monomers, individual ethylene terephthalate molecules (which, in turn are a combination of ethylene glycol and terephthalic acid). The colorants and other impurities adsorb onto the nanoparticles, which then can be removed with magnets, leaving behind the pure PET monomers. This process is now being trialled at a demonstration facility to test the process at larger scale.

It is an object of the present invention to provide a process for the extraction of one or more colour pigments from waste plastic in which the solvent used is itself recycled in the process.

It is an object of at least one embodiment of the present invention to provide a process for the extraction of one or more colour pigments from waste plastic which is a continuous, semi continuous or fed-batch process.

According to a first aspect of the present invention there is provided a process for the extraction of one or more colour pigments from waste plastic, the process comprising:
(a) introducing a waste plastic feedstock to a reactor;
(b) introducing a solvent to the reactor;
(c) mixing the waste plastic with the solvent in the reactor so as to extract at least one colour pigment by contact with the solvent;
(d) removing the solvent and extracted pigment from the reactor;
(e) separating the solvent from the extracted pigment;
(f) collecting the extracted pigment; and
(g) collecting plastic with at least one colour pigment removed;
characterised in that:
separated solvent is re-introduced to new waste plastic feedstock at step(b); and
a shear mechanism is used in the reactor to create high shear mixing and increase the contact between the one or more colour pigments and the solvent.

In this way, re-using the solvent makes the process more environmentally friendly and its recirculation can provide a continuous or near continuous process. The shear mechanism provides high shear, high contact mixing of the plastic and the solvent so as to provide maximum opportunity for the solvent to contact the pigment and thereby dissolve the pigment. The high shear mixing moves the pigment to the surface of the plastic to allow for contact with the solvent. High-shear mixing disperses, or transports, one phase or ingredient (liquid, solid, gas) into a main continuous phase (liquid), with which it would normally be immiscible. The process does not degrade or depolymerize the plastic polymer. The plastic with at least one colour pigment removed can be considered as a natural recyclate.

Preferably the waste plastic feedstock is heated. In this way, movement of the surface of the plastic is enabled to expose pigment to the solvent.

Preferably the waste plastic feedstock is heated to the HTD (heat deflection temperature). The waste plastic feedstock may be introduced as a melt. Alternatively, the waste plastic feedstock is introduced in a form from a group comprising: shred, granules and pellets. In this embodiment the reactor may heat the waste plastic feedstock.

Preferably the solvent is heated. More preferably, the reactor is heated to heat the solvent.

Preferably, the shear mechanism is located in a chamber of the reactor. Preferably the chamber includes a first inlet for the waste plastic feedstock, a second inlet for the solvent, a first outlet for the solvent and extracted pigment, and a second outlet for the plastic with at least one colour pigment removed. The outlets may be arranged below the inlets and the chamber used in a vertical configuration or arranged at an angle to the vertical. Alternatively, the inlets and outlets may be co-linear and the chamber used in a horizontal or near horizontal configuration.

More preferably, the shear mechanism is an extruder defining the shape of the chamber. An extruder forces the melted plastic and solvent together to increase the contact. The extruder may include a blade helically arranged along an inner surface. Such a blade increases the mixing of the solvent and plastic. Preferably, the shear mechanism includes a baffle comprising a shaft having a blade helically arranged and extending therefrom located within the chamber of the reactor. Preferably the baffle is rotated relative to the chamber. The blade increases the shear. More preferably there are a plurality of baffles located in the chamber, the baffles arranged in parallel with blades of neighbouring baffles overlapping. In a preferred embodiment there are two baffles counter-rotated towards each other in use. Preferably, the two baffles are counter-rotated at different speeds. This arrangement is similar to the operation of a Brabender® mixer, however such mixers only operate in a non-continuous batch mode. The helical arrangement of the blades moves the plastic and solvent through the reactor to provide a continuous process.

The shear mechanism may be an emulsifier unit. Such an emulsifier unit may macerate the plastic in the solvent to effect the mixing thereof. Preferably, the emulsifier unit comprises a high speed high shear mixer located in the chamber. Preferably the high speed high shear mixer is a Silverson® mixer as is known in the art. A Silverson® mixer emulsifies, homogenises, solubilises, suspends, disperses and disintegrates solids.

The shear mechanism may be at least two rollers counter-rotating against one another in the chamber. In this way, plastic passing between the roller is compressed in a shearing action. Compressing the plastic increases the surface area to volume of the plastic for greater efficiency in pigment extraction from the plastic surface.

The shear mechanism may be a baffled oscillation separation system. Such a system is the BOSS™ system by the present Applicants. This comprises a chamber which has an oscillating centrally located baffle structure, which causes shuggling of a mixture in the chamber. The mixture is separated by density, so the solvent, pigment and natural recycle would be separated out. The oscillating baffle structure creates shear. This system is as described in WO2016016623 and incorporated herein by reference.

The shear mechanism may be a shredder. In this way, the plastic can be shredded on entry to the chamber in the presence of the solvent. Shredding the plastic increases the available surface area for contact to the pigment while providing a shear.

The waste plastic feedstock may be any plastic which is currently recycled or destined for landfill. More preferably, the waste plastic feedstock may be selected from one or more of single source end of life thermoplastics i.e. wheelie bins all colour, containers, pipe, bottle caps, bottles, and tanks; mixed (Polyethylene)/PP(Polypropylene) recyclate and other mixed thermoplastics: ABS (Acrylonitrile butadiene styrene), Polystyrene, PVC (Polyvinyl chloride); and PET (Polyethylene terephthalate). More preferably, the waste plastic feedstock is PET. In this way, extraction of carbon black and blue/black pigment in black PET food trays can be achieved.

The waste plastic feedstock may be a plastic with metal contaminants or be a multi material product (e.g. multi-layered films). The solvent can selectively dissolve metals contained in plastic products for improved recyclability.

The waste plastic feedstock may be a plastic with a surface ink or pigment. In this way, the process can perform surface based removal of inks/pigments. This can be achieved on films and fabrics.

The waste plastic feedstock may be a plastic including contaminants such as grease, dirt and oil. Such contaminants are removed in the process.

The waste plastic feedstock may also have an odour. The process can remove this odour so that household garbage and food processing plastic packaging and parts can be used as the waste plastic feedstock.

Preferably, the solvent is a liquid. More preferably the solvent is an ionic liquid. The ionic liquid may be an EMIM (1-ethyl-3-methyl-1H-imidazolium) ionic liquid. The ionic liquid may be an BMIM (1-butyl-3-methyl-1H-imidazolium) ionic liquid. Ionic liquids have been shown to be effective at dissolving the colour pigment and bring it into solution for removal. The ionic liquid may be a deep eutectic solvent. Such a solvent is advantageously environmentally benign.

Xylene may be combined with the ionic liquid to provide the solvent. It is believed that this will give faster pigment extraction times through swelling of polymer releasing pigments. This may assist in continuous processing.

A coarse particulate additive may be combined with the solvent. This will assist in breaking up the plastic and speed up extraction of the pigment by releasing more to the surface of the plastic.

Preferably, the chamber contains an inert gas. More preferably the inert gas is nitrogen ($N_2$). Processing of heated plastic and solvent in the presence of an inert gas prevents decomposition of the plastic when at temperature.

The process may comprise the initial step of separating waste plastic feedstock. This will allow the process to be fed with like plastic and a specific solvent selected. Separation may be carried out by known techniques such as BOSS™, sink floatation tanks and NIR sorting.

Preferably the waste plastic feedstock is broken down before being introduced to the reactor. The waste plastic feedstock may be washed. The waste plastic feedstock may be shredded. More preferably the waste plastic feedstock is milled. This maximises the surface area to mass ratio assisting in bringing the pigments to the surface.

Preferably water is added to the extracted pigment and solvent at step (d) to form a precipitated pigment. This allows use of mineral extraction techniques to obtain the pigment. The pigment may be filtered out. Alternatively, the pigment may be removed using the BOSS™ system. Preferably the water is recovered by use of a hydrocyclone. Alternatively, the water may be boiled-off to create water vapour. The recovered water may be re-used. The solvent is also then re-used.

Preferably the plastic with at least one colour pigment removed is re-granulated. More preferably, the plastic with at least one colour pigment removed is pelletised. The plastic with at least one colour pigment removed may be compounded as is known the art. These processes produce a product suitable for re-sale. More preferably waste heat from this step is used to heat the solvent and/or waste plastic feedstock.

The process may include the step of passing the product through an NIR sorter. In this way, quality control is performed and any plastic with pigment can be fed back into the reactor and processed again. This increases the efficiency of process.

The process may be repeated with a different solvent to thereby remove another colour of pigment. In this way a multi-stage process is formed for stepped pigment extraction with each stage removing a different colour or group of colours with different solvent formulations. A mixed colour waste plastic feedstock is then used to produce a colourless plastic output.

According to a second aspect of the present invention there is provided a high shear mixing reactor for the extraction of one or more colour pigments from waste plastic, comprising:

a chamber providing a hollow longitudinal bore, the chamber including:

a first inlet at a first end to introduce waste plastic feedstock to the chamber;

a first outlet at a second end to expel natural recycle from the chamber;

a second inlet and a second outlet spaced apart along the bore between the first inlet and first outlet to circulate a solvent through the chamber along the bore;

at least one first blade and at least one second blade, the blades arranged to rotate with respect to each other and configured to compress a mixture of the waste plastic feedstock and solvent therebetween in a shearing action.

While the high shear mixing reactor has many features in common with an extruder, it includes a second inlet and a second outlet for the solvent to be introduced and the solvent with dissolved pigment to be removed. Additionally, the blades are arranged to compress the mixture and thereby assist in increasing the surface area of plastic exposed to increase the amount of pigment which can be at the surface and therefore contact the solvent.

The first blade may be helically arranged on a first shaft. The second blade may be helically arranged on a second shaft. Alternatively, there may be a plurality of first blades arranged on the first shaft. There may be a plurality of second blades arranged on the second shaft. In an embodiment the second blade is arranged on an inner surface of the bore. In this embodiment, the second blade remains stationary while the first blade rotates. This may resemble a screw type extruder. The helical arrangement helps move the mixture along the bore.

The first and second shafts may be arranged to lie in parallel so that the blades intertwine when the shafts are rotated relative to each other.

The first shaft may be conical. The second shaft may be conical. The bore may be conical with the apex of the cone being at the second end. The first shaft and second shafts may be arranged to be angled towards each other at the second end. In this way, the blades remain intertwined when the shafts are rotated and there will be a pressure build-up causing increased compression at the second end to expel the solvent. There may be an arrangement of protrusions on the inner surface of the bore. Such protrusions may be arranged to lie between the helical passage of the first and second blades to increase the shear action in the reactor.

Preferably there are two shafts which are counter rotated. That is one shaft operates in a clockwise direction while the second rotates in an anti-clockwise direction.

Preferably the reactor includes a heater. In this way the plastic can be kept soft but not molten to maximise pigment extraction.

In the description that follows, the drawings are not necessarily to scale. Certain features of the invention may be shown exaggerated in scale or in somewhat schematic form, and some details of conventional elements may not be shown in the interest of clarity and conciseness. It is to be fully recognized that the different teachings of the embodiments discussed below may be employed separately or in any suitable combination to produce the desired results.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

All numerical values in this disclosure are understood as being modified by "about". All singular forms of elements, or any other components described herein including (without limitations) components of the apparatus are understood to include plural forms thereof.

Embodiments of the present invention will now be described, by way of example only, with reference to the following drawings of which:

Figure 1:
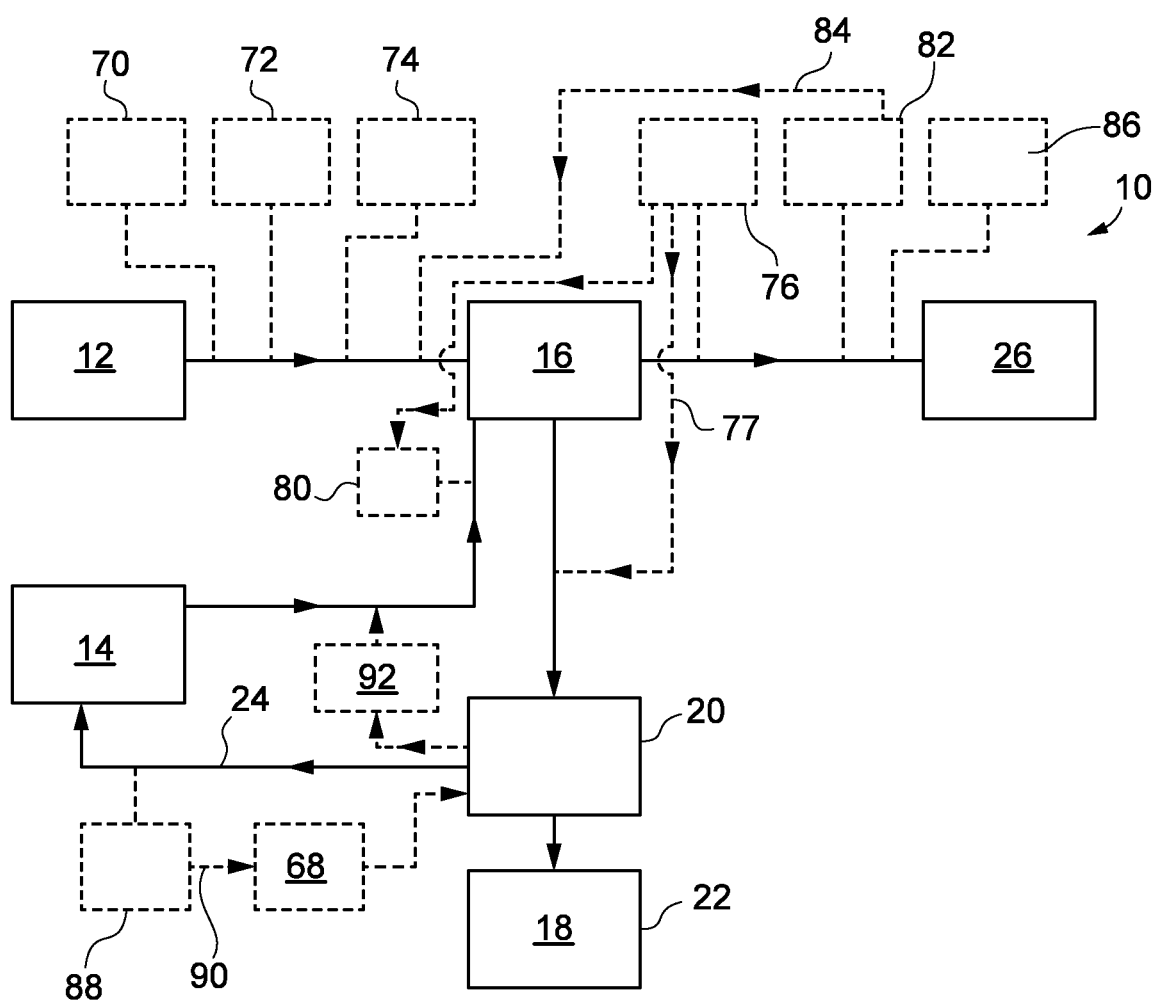
FIG. 1 is a flow chart of a process for the extraction of one or more colour pigments from waste plastic according to an embodiment of the present invention.
Figure 4:
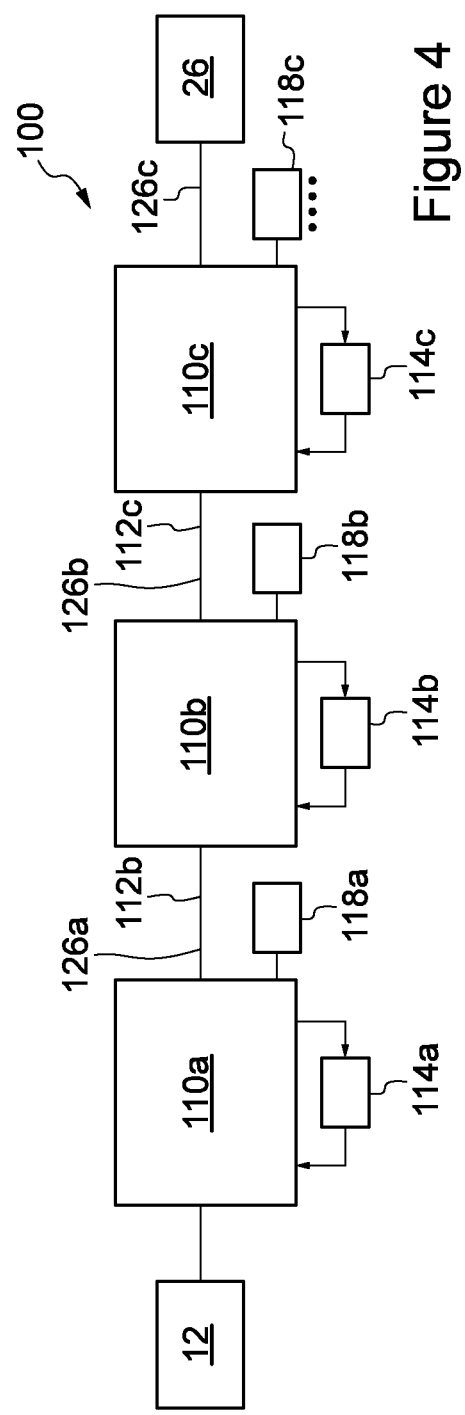
Figure 3A:
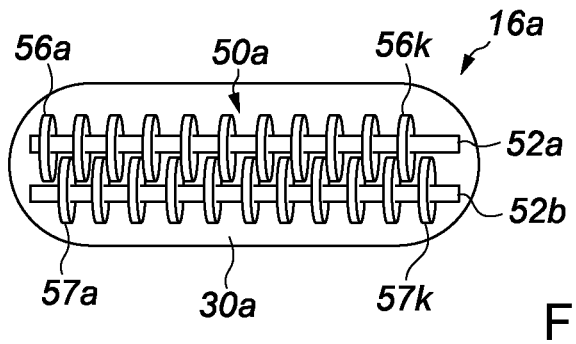
Figure 3B:
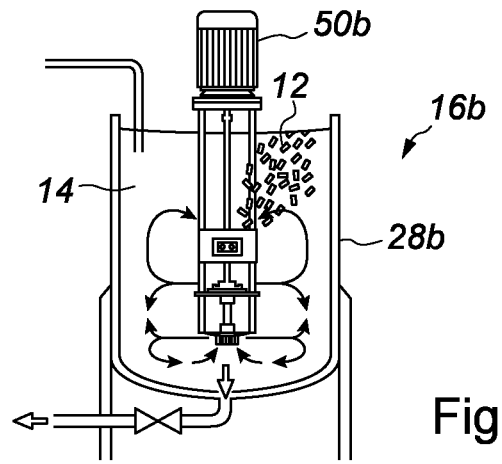
Figure 3C:
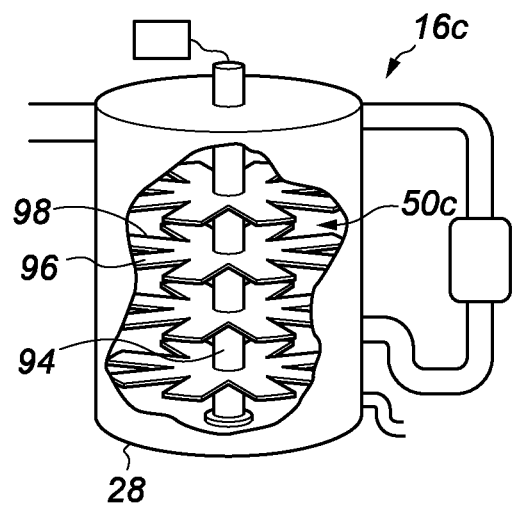

FIGS. 3(a) to (c) are schematic illustrations of reactors including shearing mechanisms for the extraction of one or more colour pigments from waste plastic in the process of FIG. 1 according to further embodiments of the present invention; and FIG. 4 is a flow chart for a multi stage process for the extraction of one or more colour pigments from waste plastic according to an embodiment of the present invention.

Referring initially to FIG. 1 of the drawings there is illustrated a process, generally indicated by reference numeral 10, for the extraction of one or more colour pigments from waste plastic according to an embodiment of the present invention. The process 10 mixes a waste plastic feedstock 12 with a solvent 14 in a reactor 16. The solvent 12 with the extracted colour pigment 18 is output for the pigment 18 to be separated 20 and collected 22. The solvent 14 is recycled 24 and returned to the reactor 16. The colourless waste plastic 26 is then provided as a product to the recycling industry. Note that while we refer to colourless waste plastic 26, this is a plastic in which at least one colour pigment has been removed and not necessarily a plastic entirely devoid of colour. These are the essential steps of the process 10 and are indicated in solid lines/boxes in FIG. 1. Those parts in broken lines/boxes are optional steps to be described hereinafter.

The feedstock 12 is any plastic which is currently recycled or destined for landfill. Single source end of life thermoplastics i.e. wheelie bins all colour, containers, pipe, bottle caps, bottles, and tanks can be used. Mixed PE (Polyethylene)/PP(Polypropylene) recyclate and other mixed thermoplastics: ABS (Acrylonitrile butadiene styrene), Polystyrene, PVC (Polyvinyl chloride); and PET (Polyethylene terephthalate). The feedstock 12 may be plastic film either single or multi-layered, printed upon or otherwise. The plastic may be a rigid plastic, fabric, sacks and tyres. These may be collected from households or factories. In a preferred embodiment the waste plastic feedstock 12 is coloured PE/PP/PET shred which is sometimes referred to as jazz recyclate.

The solvent 14 is any liquid in which a colour pigment in plastic can be dissolved in or create a solution with. In a preferred embodiment the solvent is an ionic liquid. The ionic liquid may be an EMIM (1-ethyl-3-methyl-1H-imidazolium) ionic liquid. The ionic liquid may be an BMIM (1-butyl-3-methyl-1H-imidazolium) ionic liquid. The ionic liquid may be a deep eutectic solvent. This list is not exhaustive as there may be other solvents which can work. The advantage of the ionic liquid is that the efficacy of the ionic liquid is good as previous studies have shown that it can be re-used in the process 10, twenty five times before its efficacy is degraded. In the process 10, the solvent 14 is re-circulated 24 through the reactor 16.

Ionic liquids can be considered as a novel class of 'designer' solvents, which can selectively extract small organic and inorganic molecules from plastics in their softened state through dissolution. Ionic liquids have numerous advantages over common organic solvents: they can be tailor-made to extract very specific compounds or a wide range of similar compounds, they typically have boiling points beyond their decomposition temperature, which means they will not boil or evaporate under high temperature use, and they can be made from non-toxic starting materials or designed to reduce their environmental impact.

The term ionic liquid is well-known by those skilled in the art and generally defines a combination of at least one anion and at least one cation to form a salt that is liquid, typically in the temperature range −30 degrees C. to +100 degrees C. Cations may be drawn from a wide range, including quaternary ammonium, phosphonium, pyridinium and pyrrolidinium. Anions can be drawn from an even wider range, including alkylsulphate, bis(trifluoromethylsulfonyl)imide, formate, hexafluorophosphate, tetrafluoroborate and halides. Ionic liquids used in process 10 can be water miscible or immiscible but are chosen to not dissolve or decompose the plastic polymer 12. The mixing ratio for plastic 12 to ionic liquid is in the range of 1:1 to 1:15.

Figure 2:
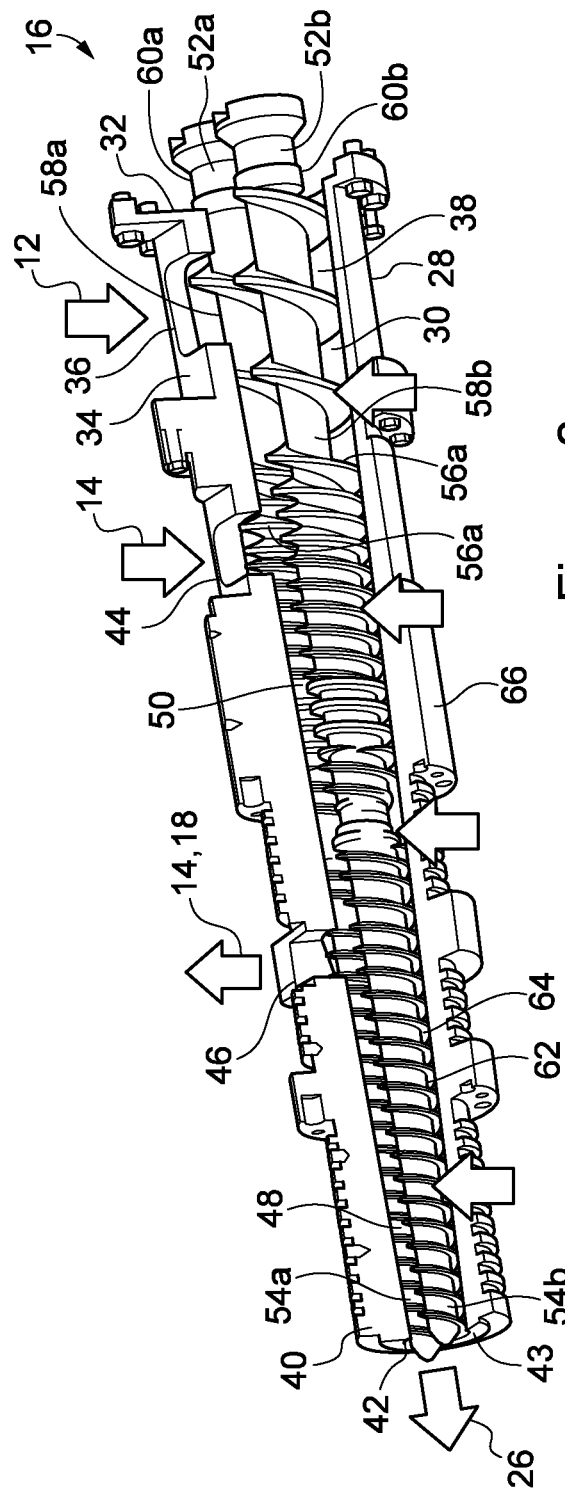
FIG. 2 is an illustration of a high shear mixing reactor for the extraction of one or more colour pigments from waste plastic according to an embodiment of the present invention.

The reactor 16 provides an environment in which the waste plastic feedstock 12 and the solvent 14 are combined via high shear mixing which brings the pigment 18 to the surface of the plastic feedstock 12 so that the solvent 14 can come into contact with it and form a solution, thereby extracting the pigment 18 from the plastic feedstock 12 to decolour the plastic 12. An example of a reactor 16, according to an embodiment of the present invention, is shown in FIG. 2. The reactor 16 comprises a vessel 28 enclosing a chamber 30. The vessel 28 is an elongate body having at a first end 32, on an outer surface 34, a first inlet 36 being an aperture for the passage of the waste plastic feedstock 12 into an upper end 38 of the chamber 30. At the second end 40 of vessel 28 there is a first outlet 42 on the bottom face 43 of the vessel providing an exit aperture for colourless waste plastic 26. On the outer surface 34, between the first inlet 36 and the second end 40, there is a second inlet 44 and a second outlet 46, to provide a circulation path for the solvent 14 to enter the chamber 30 and exit it with the colour pigment 18. It will be appreciated that some solvent 14, with or without pigment 18, can also exit the first outlet 42.

Within the chamber 30 there is a shearing mechanism 50. Shearing mechanism 50 comprises two shafts 52a,b which are conical in shape with the narrower ends 54a,b arranged at the lower end 48 of the chamber 30. Each shaft 52a,b has a helically arranged blade 56a,b arranged on an outer surface 58a,b. The blade 56a,b is more tightly wound at the lower end with smaller spacing between each revolution. While one long blade 56a,b is shown, there may be a number of blades spaced out along the outer surface 58a,b from an upper end 60a,b to the lower end 54a,b. Such multiple blades may be arranged entirely circumferentially to provide a stacked array of rollers. The blades 56a,b are arranged to overlap or intertwine so that when rotated, preferably counter to each other, the mixture in the chamber is churned or kneaded by being compressed between the blades 56a,b in a shearing action. This creates a turbulence to the mixture, re-orientating particles pf plastic so that on the next pass, revolution, a new surface is exposed for contact with the solvent. To further enhance the shearing process, protrusions 62 may be formed on the inner surface 64 of the chamber 30. These protrusions 62 lie between the coils of the blades 56a,b to give a shearing action around the blades 56a,b. The narrowing of the blades 56a,b and the chamber 30 at the lower end 48, increases pressure upon the mixture, which increases contact between the plastic 12 and solvent 14, but also causes the solvent 14 with dissolved colour pigment 18 to be expelled from the chamber 30, through the second outlet 44. The remaining plastic 12 with the pigment 18 removed is output through the first outlet 42. The chamber 30 is arranged at an angle so that upper end 38 is positioned above the lower end 48. In this way, gravity assists in driving the mixture continuously through the chamber 30 and the helical arrangement with rotation of the blades can assist in this.

There is a heater 66 arranged around the vessel 28 to heat the mixture within the chamber 30. The plastic 12 will be heated to the heat deflection temperature (HDT) whereupon it will soften as it is melted turning from solid into a liquid melt. The temperature is controlled to keep the plastic 12 soft but not molten with an optimised temperature for the type of plastic waste 12 determined for maximum extraction efficiency.

While the reactor 16 shown in FIG. 2 resembles a twin screw design of extruder, it includes an additional circulation path for the solvent 14 and the blades are arranged to compress the mixture as it is sheared to thereby re-orientate the plastic particles and bring the pigment 18 to the surface of the plastic 12 for exposure to the solvent 14. Plastic 12 and solvent 14 are separated either hot or cold by a simple phase separation. The process 10 for extraction of pigment 18 can therefore be considered as a more mechanical process over an entirely chemical process used in the laboratory and prior art. However, it has been found advantageous to keep the chamber 30 bathed in an inert gas. Nitrogen would be a suitable choice. The inert gas prevents air entering the chamber, effectively sealing it, so that the plastic does not decompose on exposure to temperature when heated.

Returning to FIG. 1, on exiting the reactor 16, the solvent 14 with the extracted pigment 18 then goes through pigment separation 20. Any separation system may be used but in a preferred embodiment water 68 is added to form a precipitated pigment. Standard mineral ore extraction techniques can then be applied which are all environmentally friendly through the use of the water 68. The pigment 18 may be filtered out.

The solvent 14 can be removed for recycling by precipitation of the extracted pigment/dye 18 using a suitable antisolvent, selected from water, acetone, methanol, diethyl ether, acetonitrile, dichloromethane, toluene, tetrahydrofuran or hexane. The selection will be dependent on the particular solvent 14 selected.

Alternatively, the pigment 18 may be removed using the BOSS™ system. The BOSS™ system is a baffled oscillation separation system and shown in FIG. 3(c). This comprises a chamber which has an oscillating centrally located baffle structure 94, which causes shuggling of a mixture in the chamber. The mixture is separated by density, so the pigment is separated from the solvent and water. This system is as described in WO2016016623 and incorporated herein by reference.

The separated solvent 14, is recycled and recirculated 24 back to the reactor 16 for re-use. The colourless waste product 26 is output from the first outlet 42 of the chamber 30.

By selection of a suitable solvent 14, the extraction of carbon black and blue/black pigment from PET food trays can be achieved by use of process 10. Additionally, the high shear mixing process which aims to bring pigments to the surface of the plastic will automatically expose surface inks or pigments on the plastic feedstock 12 and handle its removal. The process 10 through selection of the solvent 14 has been found to remove odour from the waste plastic feedstock 12 also.

There are a number of additional optional steps which can be used in the process 10. Any steps can be selected as required.

The waste plastic feedstock 12 can undergo a pre-treatment step 70. In this step the waste plastic 12 is washed to remove surface dirt oil and grease. However, if the step 70 is omitted it has been found that the process 10 will remove these contaminants in the reactor 16.

The waste plastic feedstock 12 can be sorted and separated 72. Known separation processes such as NIR (near infra-red) sorting, sink flotation tanks and the BOSS™ system can be used to allow the feedstock to be formed of like plastic and or like colour pigmentation. This batching of feedstock 12 allows selection of the most appropriate solvent 14 so that it is tailored to the plastic 12/pigment 18 combination.

An important additional step is to mechanically breakdown 74 the plastic 12. This is done to increase the surface are to mass of the plastic and therefore expose more of the pigment 18 for contact with the solvent 14. Shredding is a known breakdown technique though the waste plastic feedstock 12 may have been supplied in this form. Milling and particularly fine-milling is a preferred breakdown technique providing the greatest surface area/mass ratio. This step 74 minimises downstream process cost and complexity as the colour removal is by extraction rather than extraction combined with agitation.

On exit from the reactor 16, the colourless plastic product 26 can undergo a re-granulation step 76. Here any solvent 14 or solvent/pigment combination can be drained off 77 and returned for pigment separation 20 and recirculation 24. The colourless plastic product can be pelletised by compounding to provide a saleable product. This step 76 produces heat and a further step 80 may be in using this heat to pre-heat the solvent 14 before it enters the reactor 16 or assists in heating the chamber 30 in the reactor 16.

A quality control step 82 can be used. In this step 82, the colourless plastic product 26 is passed through a NIR (near infra-red) sorter. This is a known colour sorting process for plastics and currently the only way to obtain natural recyclate i.e. the valuable true colourless plastic, from mixed colour feedstock. By optically sorting with IR any plastic which still contains an unacceptable level of colour pigment 18 can be effectively rejected and passed back 84 to the reactor 16 to be reprocessed with further solvent 14. This step 82 may not be necessary depending on the efficacy of the process 10 but will maintain quality. Instead of being passed back 84, the sorted plastic can be sold on.

A bagging step 86 can be added to pack the colourless plastic product 26 as natural recyclate for sale.

Further steps may be added on the solvent 14 recirculation path 24. As described before water 68 can be added to the solvent 14 with pigment 18 solution to form a precipitate. This can then be sieve separated, or collected by froth filtration as is known in the art so that the pigment 18 is separated 20 and collected 22, with the now hydrated solvent 14 screened out. The water 68 can be recovered in a step 88 such as by use of one or more hydrocyclones in series, or may be boiled off to create water vapour. The extracted water 68 can be recycled 90 back to form the precipitate in the separation step 20. Having a hydrated solvent 14 i.e. solvent 14 and water mix can be advantageous as it can prevent many solvents, such as ionic liquids, from decomposing.

Further additives 92 can be provided to the solvent 14 prior to its introduction to the reactor 16 to speed up extraction and thus increase efficiency. These provide assistance in the timings for a continuous process. These additives 92 may be particulates which further break up the plastic to expose the pigment 18. Alternatively, they may comprise magnetic particulates which can attract contaminant metals in the plastic feedstock 12 while in the reactor 16. For a solvent 14 which is an ionic liquid, the addition of xylene has been shown to decrease extraction time and thus improve extraction efficiency by swelling of polymer releasing pigments. These additives 92 can be removed at pigment separation 20 and/or re-granulation 76.

Reference is now made to FIGS. 3(*a*)-(*c*) which illustrate alternative embodiments of high shear mixing reactors 16*a*-*c* for use in the process 10. Like parts to those of FIG. 2 are provided with appropriate suffixes 'a', 'b' and 'c'. FIG. 2 illustrated a reactor 16 based on an extruder with a shearing mechanism 15 being formed as twin screw-threads. This operation is akin to the known Barbender® mixer. It will be realised that a single screw-thread could be used with the protrusions 62 on the surface 64 of the chamber 30 providing the opposing blade. Separate blades 56*a*-*k*,57*a*-*k* arranged perpendicularly on two shafts 52*a*,*b* can be used as the shearing mechanism 50*a* in a reactor 16*a* as shown in FIG. 3(*a*). In FIG. 3(*b*) there is illustrated a reactor 16*b*, in which the vessel 28*b* is filled with solvent 14. Plastic feedstock 12 is introduced, shown as shredded particles, and a shearing mechanism 50*b* arranged in the vessel 28*b* is a Silverson® high speed mixer which is known as a high shear mixer which emulsifies, homogenises, solubilises, suspends, disperses and disintegrates solids. FIG. 3(*c*) illustrates the BOSS™ system which can be used as a high shear mechanism 50*c*. The centrally located baffle 94 does not rotate but oscillates up and down at a selected frequency and amplitude. The separate discs 96 have apertures 98 for allowing a mixture i.e. plastic 12 and solvent 14 to pass therethrough. Shuggling of the mixture causes separation of the components based on their densities, with the solvent 14 being used to release the colour pigment 18 and then being used to separate the pigment 18 from the solvent 14. The shearing action occurs via movement of the mixture through the apertures 98. It will be appreciated by those skilled in the art that a shredder could also be used as a shearing mechanism. In this case, the shredding will occur in the presence of the solvent 14.

As described hereinbefore, the solvent 14 can be selected to extract a single colour pigment 18 or a group of colours. For multiple colours a mixture of ionic liquids may be required as the solvent 14. An alternative arrangement is to provide a multi-stage system, generally indicated by reference numeral 100, as shown in FIG. 4. Like parts to those of FIG. 1 have been given the same reference numeral but with the addition of '100'. System 100, comprises multiple processes 110*a*,*b*,*c* in series with each process 110*a*,*b*,*c* being as described herein with reference to FIG. 1. At each successive stage 110*b*,*c* the waste plastic feedstock 112*b*,*c* is the colourless plastic product 126*a*,*b* from the previous stage 110*a*,*b*. Each solvent 114*a*,*b*,*c* is different and selected to extract an individual or group of colour pigments 118*a*,*b*,*c* unique to each process 110*a*,*b*,*c*. In this way, the final colourless plastic product 126*c* can be predetermined to be an ideal natural recyclate.

The process 10 can be run continuously, semi-continuously or batch-fed and operated at a commercial scale.

The principle advantage of the present invention is that it provides a process for the extraction of one or more colour pigments from waste plastic in which the solvent used is itself recycled in the process.

A further advantage of the present invention is that it provides a process for the extraction of one or more colour pigments from waste plastic which is a continuous, semi continuous or fed-batch process.

A yet further advantage of at least one embodiment of the present invention is that it provides a process for the extraction of one or more colour pigments from waste plastic which can extract carbon black and blue/black pigment in black PET food trays.

It will be appreciated by those skilled in the art that modifications may be made to the invention herein described without departing from the scope thereof. For example, other shearing mechanisms can be used. The reactor can be made of steel or of a non-magnetic material if metal contaminants are to be removed.

We claim:

1. A process for the extraction of one or more colour pigments from coloured waste plastic, the process comprising:
   (a) introducing a coloured waste plastic feedstock to a reactor;
   (b) introducing a solvent to the reactor, wherein the solvent comprises an ionic liquid;
   (c) mixing the coloured waste plastic with the solvent in the reactor so as to extract at least one colour pigment by contact with the solvent, wherein the coloured waste plastic feedstock is heated to melt the plastic;
   (d) removing the solvent and extracted pigment from the reactor;
   (e) separating the solvent from the extracted pigment;
   (f) collecting the extracted pigment; and
   (g) collecting colourless plastic with the at least one colour pigment removed;
   characterised in that:
   the coloured waste plastic is plastic in which the entire plastic is compounded with the at least one colour pigment when the plastic is manufactured and the at least one colour pigment is intertwined with polymer molecules;
   separated solvent is re-introduced to new coloured waste plastic feedstock at step (b); and
   in step (c) a shear mechanism is used to increase the contact between the one or more colour pigments and the solvent by compressing the mix and re-orientating plastic particles to bring the at least one colour pigment to a surface of the plastic for exposure to the solvent.

2. The process according to claim 1 wherein the solvent is heated.

3. The process according to claim 1 wherein the shear mechanism is located in a chamber of the reactor, the chamber having: a first inlet for the waste plastic feedstock; a second inlet for the solvent; a first outlet for the solvent and extracted pigment; and a second outlet for the plastic with at least one colour pigment removed and wherein the outlets are arranged below the inlets.

4. The process according to claim 1 wherein the waste plastic feedstock is selected from one or more of the group consisting of:
   thermoplastics, mixed PE/PP recyclate, ABS, Polystyrene, PVC and PET.

5. The process according to claim 1 wherein the process is operated in a form selected from a group consisting of: continuous, near continuous and batch-fed.

6. The process according to claim 3 wherein the chamber contains an inert gas to prevent decomposition of the plastic.

7. The process according to claim 1 wherein the waste plastic feedstock is broken down by milling before being introduced to the reactor.

8. The process according to claim 1 wherein water is added to the extracted pigment and solvent at step (d) to form a precipitated pigment.

9. The process according to claim 8 wherein the water is recovered after the pigment is separated and the water is recycled.

10. The process according to claim 1 wherein the plastic with at least one colour pigment removed passes through an NIR sorter to determine if sufficient colour pigment has been removed.

11. The process according to claim 1 wherein the shear mechanism is selected from a group consisting of: an extruder, an emulsifier unit, two-rollers counter-rotating against one another, a baffled oscillator separation system and a shredder.

12. A process for the extraction of one or more colour pigments from coloured waste plastic, the process comprising:
   (a) introducing a coloured waste plastic feedstock to a reactor;
   (b) introducing a solvent to the reactor, wherein the solvent copmrises an ionic liquid;
   (c) mixing the coloured waste plastic with the solvent in the reactor so as to extract at least one colour pigment by contact with the solvent;
   (d) removing the solvent and extracted pigment from the reactor; and (d)
   (e) collecting colourless plastic with the at least one colour pigment removed;
   characterised
   in that:
   the coloured waste plastic is plastic in which the entire plastic is compounded with the at least one colour pigment when the plastic is manufactured and the at least one colour pigment is intertwined with polymer molecules;
   step (c) comprises mixing the coloured waste plastic as a melt with the solvent;
   and
   in step (c) a shear mechanism is used to increase the contact between the one or more colour pigments and the solvent.

* * * * *